May 20, 1958 R. V. JUDY 2,835,751

AUTOMATIC ROUTINE TEST APPARATUS

Filed Jan. 26, 1955

TEST APPARATUS 200

United States Patent Office 2,835,751
Patented May 20, 1958

2,835,751

AUTOMATIC ROUTINE TEST APPARATUS

Robert V. Judy, Chicago, Ill., assignor to International Telephone and Telegraph Corporation, New York, N. Y., a corporation of Maryland Application January 26, 1955, Serial No. 484,278

3 Claims. (Cl. 179—175.2)

This invention relates to automatic routine test apparatus, being concerned more particularly with apparatus of that type which may be used for making routine tests of selected pairs in working cables of telephone plants and the like. The principal object is to provide suitable apparatus which will serve to detect faults in sheathed cables such as those serving local telephone lines to permit corrections before service is disrupted.

A common method of detecting a puncture in a cable sheath is the gas-alarm method, wherein a gas is normally retained under pressure within a cable sheath, and loss of pressure sets off an alarm device. This method has proven satisfactory as applied to trunk cables, for they require only that the ends of the cable be sealed. Subscriber-pair cables, however, must be frequently branched (by splicing) into smaller cables for distribution to the subscriber's premises, which usually renders it impractical to use the gas-alarm method for these cables.

According to the invention, automatic routine test apparatus is provided which cyclically applies a series of tests to selected pairs of a cable in succession to detect lower insulation resistance which may occur as when moisture penetrates the cable through a break in the cable sheath.

In the preferred form of the invention, a selecting switch is arranged to associate the test apparatus with groups of terminals in succession, and jumpers are provided for connecting the terminal groups respectively with desired cable pairs each of which appears in a separate cable of the plant or in a separate remote cable branch serving a locality. Thus, a break permitting moisture to enter any such cable or cable branch is detected by the test apparatus because of the resultant lowered insulation resistance of the pair thereof under cyclic test by the testing apparatus.

The test apparatus is arranged to maintain the test switch connected to any pair not meeting the tests, and to signal an attendant. A further feature is that the test switch makes a third-wire busy test for each cable pair encountered and responsively passes over any cable pair found to be in use. Thus, working cable pairs may be included, along with non-working cable pairs, in the group selected for routine tests by the test apparatus.

Figure 1:
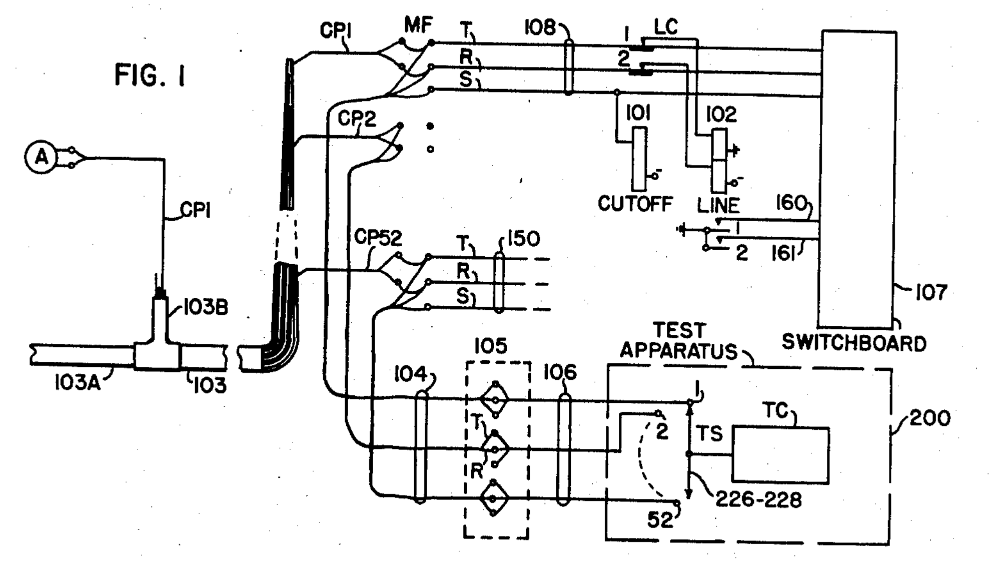
Figure 2:
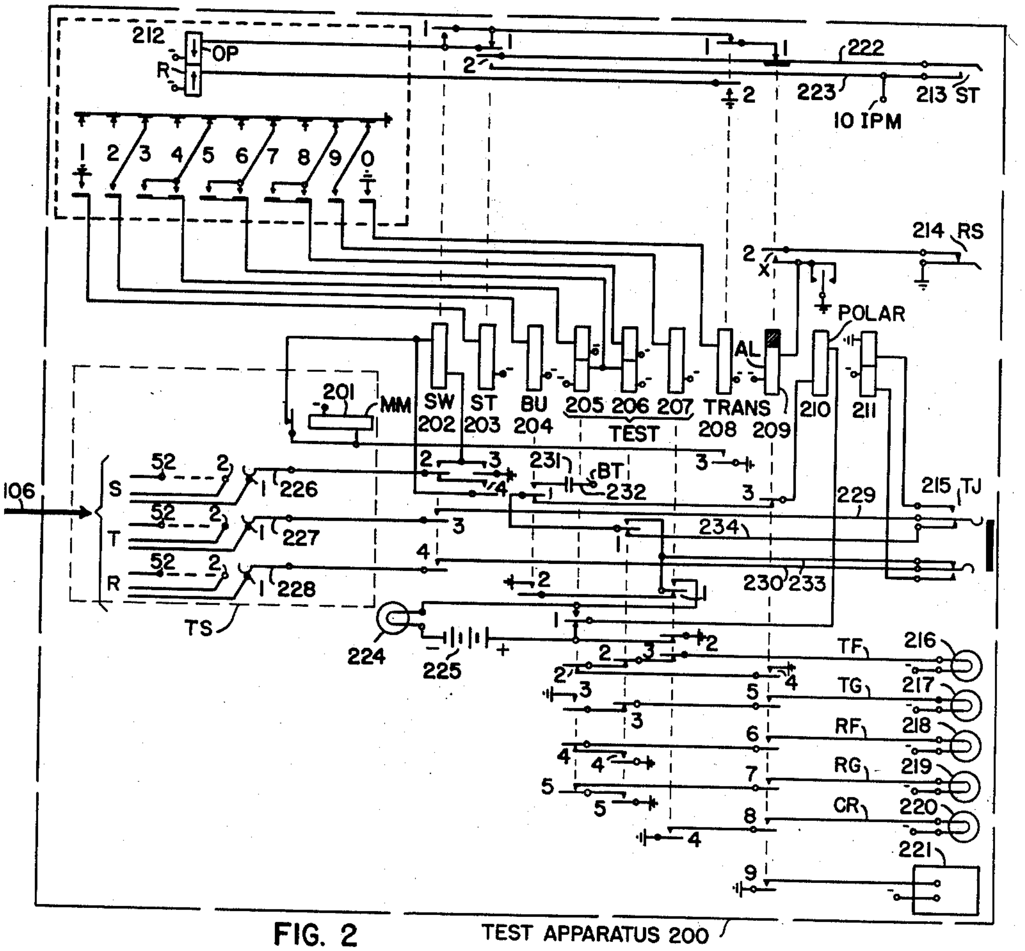

The above-mentioned and other features and objects of this invention and the manner of attaining them will become more apparent and the invention itself will be best understood, by reference to the following description of an embodiment of the invention taken in conjunction with the accompanying drawings comprising Figs. 1 and 2, wherein:

Fig. 1 shows the general relationship between a cable under test and test apparatus embodying the invention; and Fig. 2 is a circuit diagram of the test apparatus of Fig. 1.

I. *General description—Fig. 1*

Referring now to Fig. 1 of the drawings, a simplified diagram of a portion of a telephone system is shown in order to more clearly set forth the relationship between subscriber-pair cables and the automatic routine test apparatus.

A number of subscriber-pair cables, such as cable 103, are provided for connecting the lines of subscribers to the telephone switchboard. Cable 103, comprising cable pairs CP1 to CP52, terminating on the main frame MF, is frequently branched for distribution to the subscriber's premises, one of such branches being branch cable 103B carrying cable pairs, such as CP1 associated with subscriber A. Extension branch 103A, of cable 103, may have several further branch cables (not shown) serving other subscribers.

Each subscriber-paired cable, such as 103, is terminated at a main frame MF and working cable pairs, such as CP1 and CP52, are extended to the switchboard 107 by conductor groups, such as 108 and 150.

The line circuit LC, assigned to the cable pair CP1 associated with subscriber A, comprises line and cutoff relays 102 and 101 and its switchboard multiple (tip, ring, and sleeve conductors T, R, and S) which is extended back to the main frame MF via conductor group 108. The conductors T and R, of cable pair CP1, are connected on the main frame by a two-conductor jumper to conductors T and R of group 108 in the usual manner. The sleeve conductor S being extended back to the main frame for the usual test purposes.

Cable pair CP52 is extended to its assigned line circuit (not shown) by conductor group 150.

The selected cable pairs to be tested are connected to selecting switch TS of test apparatus 200 via jumpers 104, terminal strip 105 and jumpers 106. As illustrated, there are fifty-two such pairs, CP1 to CP52, which are extended to selecting switch TS as three-conductor jumpers for working cable-pairs, such as CP1 and CP52, and as a two-conductor jumper for a vacant (not in use) pair, such as CP2.

The test apparatus 200 consists of a selecting switch TS and its associated test-circuit TC. The selecting switch TS may be of the usual multi-brush rotary stepping magnet-driven type. It is illustrated as having fifty-two selecting positions, being thus a 52-point switch. The number of selected cable pairs to be tested is thereby determined by the number of selecting positions of the selecting switch TS.

The test apparatus 200 is shown as connected to a single subscriber-pair cable 103 having several branch cables, but it will be readily understood that cable pairs from other cables (not shown) may be substituted for cable pairs CP1 to CP52. When a cable is tested, it is the general practice to select at least one cable pair in each cable branch, thereby testing each cable branch.

When the attendant at the telephone exchange desires to test the selected lines, he operates a start key which causes the selecting switch TS to advance from its previously occupied position over conductor sets 106 in search for an idle or vacant (ungrounded) cable pair. Upon finding an ungrounded pair the apparatus 200 marks it busy to the switchboard 107.

In the illustrated example, if cable pair CP1 tests idle the selecting switch stops and extends ground potential back over the sleeve conductor S of jumpers 106 and 104 to operate cutoff relay 101.

At its contacts 1 and 2, relay 101 disconnects line relay 102 in the usual manner.

Normally, when the subscriber lifts his handset (not shown) line relay 102 would respond by grounding control wires 160 and 161 in the usual manner to control the apparatus at switchboard 107.

If the cable pair CP1 meets the test conditions applied by the test apparatus 200 successfully, the connection is released and the selecting switch TS proceeds to search for the next idle or vacant pair to be tested. If pair CP1 does not meet the test condition, selecting switch TS remains associated with it and the attendant is signalled as will be hereinafter described.

The test apparatus associates itself with the selected pairs in succession in recurring cycles until it is stopped by the attendant.

II. *Detailed description—Fig. 2*

Referring now to Fig. 2 of the drawings, which shows in circuit detail the test apparatus 200 of Fig. 1, it will be understood that other test apparatus (not shown) is similar to the illustrated example.

The device 212 of Fig. 2 is a magnetic impulse counter which may be of the type disclosed in the United States Patent No. 2,538,818, granted January 23, 1951. Counter 212 operates its contact sets 1 to 0 successively responsive to respective energizations of winding OP.

If the attendant at the exchange desires to test the selected lines, he may do so by operating start key 213, which is of the well-known locking type. Key 213 extends a 10 I. P. M. interrupted ground potential over wire 222, back contacts 1 of relays 209, 208, and 203, to the operate winding OP of counter 212.

Upon the receipt of the ground impulse over the previously described path counter 212 operates its contacts 1 to extend ground to the winding of start relay 203 to operate it. Relay 203 remains operated while the test apparatus makes selected tests of the connected cable pair CP1 and is automatically restored upon the receipt of the tenth impulse of the test series as will hereinafter be described.

At its contacts 2, relay 203 prepares an alternative operate circuit for counter 212 over wire 223; at its contacts 3, it prepares an operate circuit for switch relay 202; at its contacts 1, it opens the operate circuit for counter 212; and at its contacts 4, it completes the operate circuit for motor magnet 201 of selecting switch TS.

Magnet 201 now operates in a buzzer-like manner to advance its brushes 226 to 228 from its last occupied position over jumpers 106 (Figs. 1 and 2) until an idle or vacant cable pair (ungrounded) is found. The stepping circuit is from ground encountered by brush 226, through back contacts 2 of relay 202, contacts 4 of 203, interrupter contacts of 201, and winding of 201, to battery. When an ungrounded cable pair (such as CP1) is reached, test brush 226 finds no guarding ground on conductor S thereof, whereupon magnet 201 ceases to operate. Switching relay 202, which is short-circuited as long as brush 226 encounters ground, now operates in series with magnet 201.

At its contacts 3 and 4, switching relay 202 extends conductors T and R, of 106, through brushes 227 and 228, wires 229 and 230 test jack 215, to wires 234 and 233; at its back contacts 2, it opens the operate circuit for 201; at its front contacts 2, it applies ground through brush 226 to wire S of group 106 to operate cutoff relay 101 (Fig. 1) to busy its associated line circuit; and at its contacts 1, it completes an operate circuit for counter 212 from wire 222.

At its contacts 3, switch relay 202 also completes a connection to test the tip conductor T, of pair CP1, for the presence of a foreign potential thereon before the receipt of the second impulse of the test series by counter 212. A polar relay 210, which actuates its contacts responsive to a current flow through its winding, is connected in series with wire 234 (extension of conductor T) and ground. The operate circuit for relay 210 is from ground at contacts 2 of relay 207, back contacts 1 of relay 205, winding of 210, contacts 3 of alarm relay 209, back contacts 1 of busy relay 204, back contacts 1 of relay 206, to wire 229. The presence of a foreign potential on the tip conductor T would operate relay 210 which operates slow-operating alarm relay 209.

At its preliminary-make contacts 2, alarm relay 209 locks itself operated to ground through reset key 214; at its contact 1, it opens the operate circuit for counter 212; at its contacts 4, it extends ground through contacts 2 of relays 205 and 206, contacts 3 of relay 207, wire TF to light lamp 216; and at its contacts 9, it completes the operate circuit for buzzer 221. Contacts 5 to 8 of relay 209 will be described in connection with other tests.

Alarm relay 209 has been rendered slow-operating to prevent its premature operation in event that the condensers (not shown) in the subscriber's subset are still retained in a charged condition which would cause relay 210 to respond until the charge has drained off.

After the attendant has recorded the case of trouble or corrected it, he may continue the test cycle by operating release key 214 to restore relay 209.

Selecting switch TS is provided with indicating means (not shown) whereby the attendant may readily identify the position of its associated brushes 226 to 228, thereby identifying the associated cable pair.

Upon restoring, relay 209, extinguishes lamp 216; disconnects buzzer 221, and closes the operate path for relay 210 and counter 212.

The absence of a foreign potential on the tip conductor T allows the next impulse of the test series to energize winding OP, of counter 212, to operate its contact set 2.

The reoperation of counter 212 operates busy relay 204 from ground at its back contacts 3, operated contacts 2, through the winding of 204, to battery.

At its contacts 1 and 2, busy relay 204 applies busy-tone current to conductors T and R from busy tone source BT, via wire 232 and condenser 231, back contacts 1 of relay 206 and wire 234; while contacts 2, of 204, extends ground through back contacts 1 of relay 207, to wire 233 thereby completing the busy-tone circuit. During the application of busy tone the operate circuit for relay 210 is opened at back contacts 1 of relay 204.

The receipt of the third and fourth impulse, over wire 222, of the test series energizes operate winding OP, of 212, to actuate its contacts 3 and 4. At its break contact 3, counter 212 restores busy relay 204; and at its make contacts 3, it operates test relay 205 from ground at back contacts 5, strapped front contacts 3 and 4, upper winding of 205, to battery.

Upon restoring, busy relay 204 removes busy tone and at its back contacts 1 closes the operate circuit for relay 210.

The operation of test relay 205 tests the tip conductor T, of the connected cable pair CP1, for the presence of ground thereon. At its front contacts 1, relay 205 connects the ungrounded (negative) pole of test battery 225 through current-limiting lamp 224, which may be the well-known tungsten-lamp type commonly used in telephone practice, to one side of the winding of relay 210, the other side of relay 210 being connected to the tip conductor T, via contact 3 of relay 209, back contacts 1 of relays 204 and 206, and wire 234.

The test battery 225 is of a higher potential (150 volts, for example) than the normal exchange battery of 48 volts. The application of the higher battery potential serves to detect lower insulation resistance.

At its contacts 3, relay 205 prepares an operate circuit for lamp 217 via contacts 3 of relay 206, contacts 5 of relay 209, and wire TG; and at its contacts 2, it further opens the operate circuit for lamp 216. Contacts 4 and 5 serve no function at this time and will be described in connection with other tests.

The presence of ground on the tip conductor T will operate relay 210 over the described path to operate alarm relay 209 as previously described. Upon operating, relay 209 opens the operate circuit for counter 212 and at its contacts 4 and 9 lights lamp 217, and sounds buzzer 221.

After having recorded or corrected the trouble, the attendant may reset the test apparatus in the manner as previously described.

The absence of ground on the tip conductor T extends the fifth and sixth impulses of the series to winding OP, of 212, thereby operating its contacts 5 and 6 to test for the presence of ground on the ring conductor R, of cable pair CP1.

The receipt of the fifth impulse of the test series operates counter 212 to actuate its contact set 5 to operate relay 206 in parallel with relay 205. At its break contacts 5, 212 opens the previous operating circuit for test relay 205; and at make contacts 5, it connects the lower windings of test relays 205 and 206 in parallel.

With test relays 205 and 206 operated, one side of the winding of polar relay 210 is connected to the ungrounded pole of battery 225 in the manner as previously described, and the other side of its winding is connected to the ring conductor R, via contacts 3 of 209, back contacts 1 of 204, front contacts 1 of relay 206, and wire 233.

At its contacts 2 and 3, relay 206 opens the operate circuit for lamps 217 and 216; and at its contacts 5, it prepares an operate path for lamp 219.

The presence of ground on the ring conductor R causes polar relay 210 to respond, in the manner as described, thereby operating alarm relay 209. Alarm relay 209 upon operating completes the operate circuit for lamp 219 and buzzer 221. The operate circuit for lamp 219 is from ground at contacts 5 of relay 206, contacts 5 of 205, contacts 7 of 209, and wire RG, to lamp 219.

The attendant, after recording or correcting the trouble, may again operate reset key 214 to permit the test apparatus 200 to continue the test cycle.

The absence of ground potential on the ring conductor R, of cable pair CP1, extends the seventh and eight impulses of the series to winding OP, of 212, thereby operating its contacts 7 and 8 to test for the presence of a foreign potential on the ring conductor R.

At its make contacts 7, counter 212 holds test relay 206 operated through its upper winding; and at its break contacts 7, it restores relay 205. The holding circuit for relay 206 being from ground at back contacts 9 of 212, strapped contacts 7 and 8 of 212, upper winding of 206, to battery.

Upon restoring relay 205 at its contacts 5 opens the operate circuit for lamp 219, and at its contacts 4 prepares an operate circuit for lamp 218.

With test relay 206 held operated and with relay 205 restored, one side of the winding of relay 210 is connected to ground at contacts 2 of relay 207 and the other side of its winding is connected to the ring conductor R, via contacts 3 of 209, back contacts 1 of 204, front contacts 1 of operated relay 206, and wire 233. At its contacts 2, relay 206 further opens the operate circuit for lamp 216.

The presence of a foreign potential on the ring conductor R causes relay 210 to respond thereby operating alarm relay 209.

At its contacts 6, relay 209 extends ground from contacts 4 of 206, via contacts 4 of 205, wire RF to light lamp 218; and at its contacts 9, it operates buzzer 221.

The attendant may reset the device in the manner described after the recording or correcting of the trouble.

The absence of a foreign potential on the ring conductor R extends the ninth impulse of a series to winding OP, of 212, thereby operating its contacts 9 to test the tip and ring conductors T and R for a short (cross connection) between them.

At its back contact 9, counter 212 restores test relay 206; and at its front contact 9, it operates test relay 207.

At its contacts 3, test relay 207 further opens the operate circuit for lamp 216; at its contacts 4, it prepares an operate circuit for lamp 220; at its contacts 2, it removes ground from the positive pole of battery 225; and at its contacts 1, it connects the ungrounded (negative) pole of battery 225 to wire 233 which is extended to the ring conductor R.

Relay 210 has one side of its winding connected to the positive pole of battery 225 and the other side of its winding is connected to tip conductor T via contact 3 of 209, back contacts 1 of 204 and 206, and wire 234, thereby completing the test loop.

If a short (or cross connection) exists relay 210 responds to current flow through its windings to operate alarm relay 209.

At its contacts 9, relay 209 operates buzzer 221; and at its contacts 8, it lights lamp 220 via wire CR.

The absence of a shorted condition between conductor T and R extends the tenth impulse of the series to winding OP, of counter 212 to actuate its contact set 0 to restore counter 212 and advance brushes 226 to 228 to its next position.

At back contacts 0, counter 212 restores test relay 207; and at its make contacts 0, it operates transfer relay 208.

At its contacts 1, transfer relay 208 opens the operate circuit for counter 212; at its contacts 2, it extends ground to the release winding R, of 212, to resore it to its normal illustrated position; and at its contacts 3 it energizes motor magnet 201 to advance its associated brushes 226 and 228 to the next position.

Upon restoring, counter 212 restores start relay 203 and transfer relay 108. Relay 203 upon restoring opens the operate circuit for relay 202 thereby preparing the apparatus for the next test cycle.

If the position to which brushes 226 to 228 have been advanced is idle or vacant, such as vacant pair CP2, the test apparatus seizes that cable pair and applies the various test conditions to the established connection.

During the test period, that is, the receipt of ten impulses in the series, the subscriber connected to the cable pair under test may attempt to seize a line, this causes the test apparatus to register a short across the tip and ring conductor T and R, by virtue of the subscriber's transmitter, and would thereby light lamp 220 and sound buzzer 221. If this condition occurs, the attendant would insert his telephone-test set (not shown) into test jack 215 and request a subscriber to replace his handset and attempt to call in a few moments. The insertion of the attendant's plug (not shown) into test jack 215 disconnects wires 233 and 234 from the tip and ring conductors T and R, and substitutes talking battery thereon through coils 211 in the usual manner. After the subscriber has replaced his handset the attendant may withdraw his plug from test jack 215 and upon operating the reset key 214 will cause the test apparatus to continue its test cycle.

The test apparatus 200 associates itself with the idle or vacant selected cable pairs, CP1 to CP2, in succession in recurring cycles until the apparatus is stopped by the attendant or it detects a case of trouble.

The attendant desiring to stop the test apparatus 200 at any time, may do so by releasing start key 213 which removes the ten I. P. M. impulse source from wire 222. The device, however, continues testing the connected cable pair until the counter 212 has actuated its contact set 0 which operates transfer relay 208 to restore the counter 212. An alternative impulse path is provided for counter 212, from wire 223, contacts 2 of operated relay 203, and through contacts 1 of relays 209, 208, and 202. Upon restoring counter 212 restores start relay 203 which at its contacts 2 opens the alternative impulse path from wire 223 and restores relay 202.

While I have described above the principles of my invention in connection with the specific apparatus, it is to be clearly understood that this description is made only by way of example and not as a limitation to the scope of my invention.

I claim:

1. In combination, distribution cables which may comprise respective remote branches of the same main cable, each distribution cable including a separate group of cable pairs, terminal groups, jumper conductors for connecting desired cable pairs of each distribution cable to a separate terminal group for each pair, insulation test apparatus, a selecting switch and means for operating it to bring the insulation-test apparatus into specific association with the terminal groups in succession in recurring cycles, the selecting switch including means for busy-testing each connected cable pair thereby encountered, the busy-testing means including means for withholding connection of the insulation-test means with any cable pair found to be in use, the test apparatus including means for applying an insulation test to the connection established to any idle cable pair, means controlled by the insulation-test apparatus for marking the identity of any tested idle cable pair whose insulation is found to be sub-standard.

2. In combination according to claim 1, the said means for marking the identity comprising means for holding the said selecting switch continuously in specific association with the tested cable pair, and signalling means for notifying an attendant that the selecting switch is being so held.

3. In combination according to claim 1, the said means for applying the insulation test comprising means for successively applying a series of different insulation tests.

References Cited in the file of this patent

UNITED STATES PATENTS

| | | |
|---|---|---|
| 2,393,236 | Corey | Jan. 22, 1946 |
| 2,617,897 | Kessler | Nov. 11, 1952 |
| 2,721,910 | Avery | Oct. 25, 1955 |